(Model.)

W. S. HOW.

MECHANICAL MOVEMENT.

No. 275,657. Patented Apr. 10, 1883.

Attest. Inventor.
Jas. H. Layman. Woodbury Storer How
John W. Layman.

(Model.)
2 Sheets—Sheet 2.
W. S. HOW.
MECHANICAL MOVEMENT.
No. 275,657.
Patented Apr. 10, 1883.
Fig. 6.
Fig. 7.
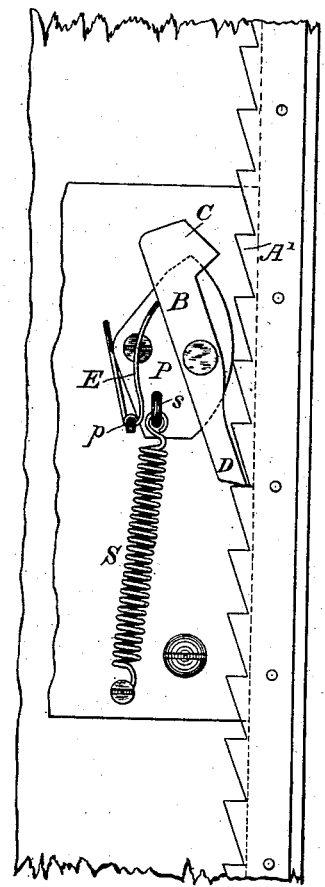
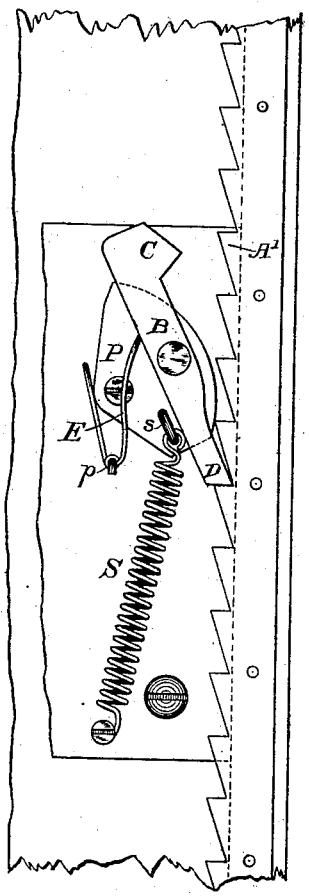
WITNESSES
Wm A. Skinkle
H. W. Elmore
INVENTOR
Woodbury S. How.
By his Attorneys
Baldwin, Hopkins, & Peyton

UNITED STATES PATENT OFFICE.

WOODBURY S. HOW, OF CINCINNATI, OHIO.

MECHANICAL MOVEMENT.

SPECIFICATION forming part of Letters Patent No. 275,657, dated April 10, 1883.

Application filed September 16, 1880. (Model.)

*To all whom it may concern:*

Be it known that I, WOODBURY STORER HOW, of Cincinnati, Hamilton county, Ohio, have invented a new and useful Automatic Detent or Mechanical Movement, of which the following is a specification.

My invention relates to improvements in the class of detents, such as dogs or pawls, which have usually hitherto been made to allow free passage of the pawl and the teeth of a rack or ratchet-wheel past each other in one direction, and to instantly arrest motion in the reverse direction; and the objects of my improvements are to provide a dog to be operated directly by the rack or ratchet with which it engages to stop the movement of the parts when too rapid a speed has been attained; to provide effectively in all positions for the escapement of the detent until a certain limit of speed shall be exceeded, whereupon the locking or stop engagement will be automatically effected at once; to provide for the stoppage in either direction when too great a speed is attained; to prevent shocks and jars by such sudden arrest of motion; and to stop the parts by a dogging action, as distinguished from a suspending or latch action.

In the accompanying drawings, which illustrate my improved mechanism in a desirable form—

Figure 1:
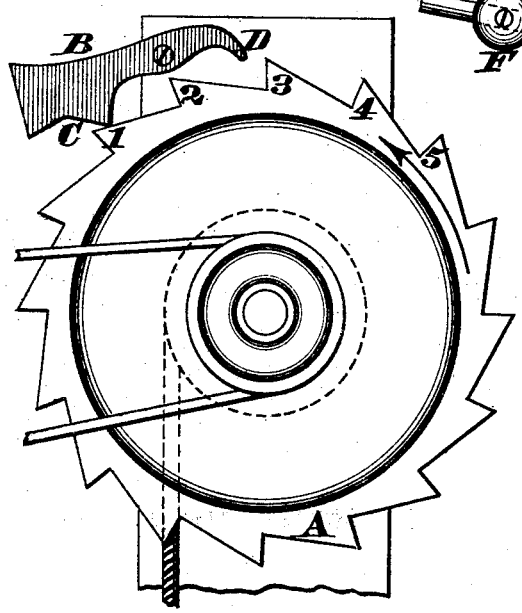
Figure 2:
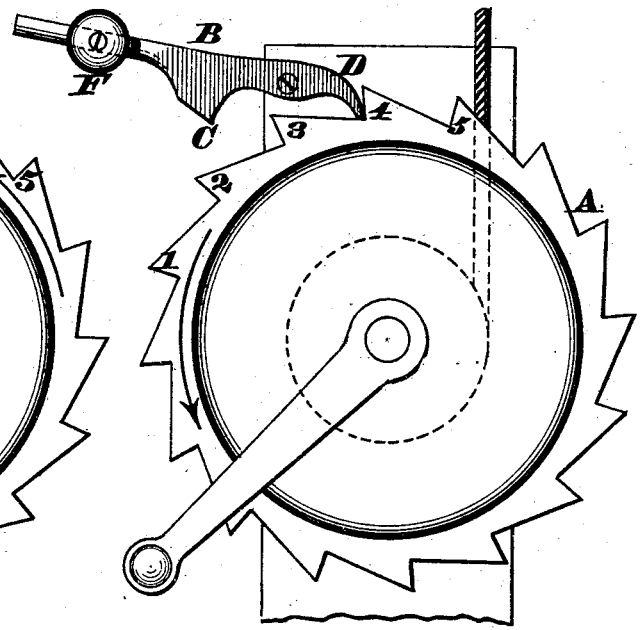
Figure 3:
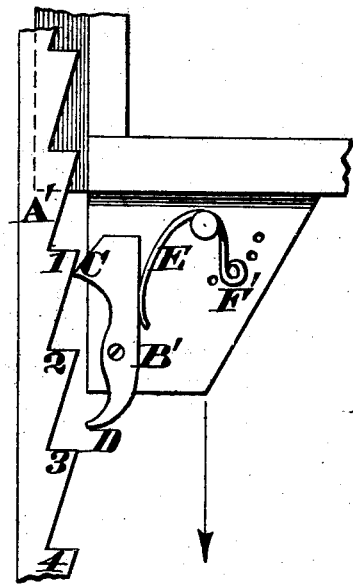
Figure 4:
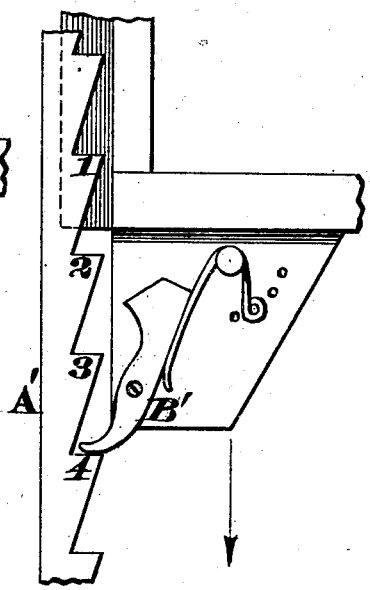
Figure 5:
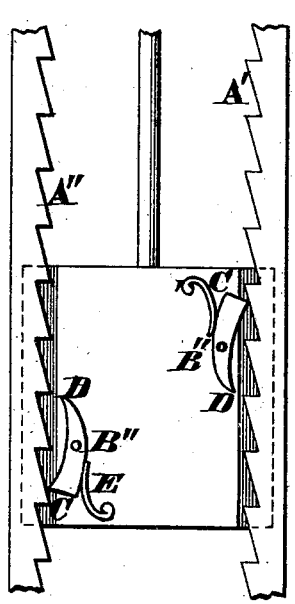

Figures 1 and 2 show the device applied to the ratchet-wheel of a hoisting-drum, the first representing the wheel moving at proper speed undogged and the second showing the wheel locked by the pawl. Figs. 3 and 4 are elevations of a typical erect or inclined rack-and-pawl modification adjustable, and showing unimpeded slow descent in Fig. 3 and arrested descent in Fig. 5. Fig. 5 is an elevation of a duplex modification of the rack-and-pawl species, showing a reversed rack with optional slow permission, or quick stoppage of sliding motion in either direction. Figs. 6 and 7 represent an arrangement for giving elasticity to the stoppage and preventing breakage.

I am aware that in a patent heretofore granted a vertical elevator is shown, in which a peculiarly-weighted hook carried on the elevator-platform and adapted to engage with a peculiarly-formed rack is controlled by an auxiliary undulating rack, on which a rollered wrist on the end of the pawl runs, so as to throw the hook into engagement with the other rack when too rapid a descent has been attained. I do not therefore claim such a duplex device.

Referring to Figs. 1 and 2, the ratchet-teeth A turn at all speeds forward under the cam C of the escapement-detent B; but on reverse rotation in the direction of the arrow the cam rides over the first tooth and is kept by preponderating gravity in contact with tooth 1 until the dog D is raised above the coming tooth 3, whereupon the cam C rides over tooth 2 and repeats the escapement of the dog with tooth 4, provided the speed is within proper limits. An excessive speed will cause a tooth —say 2—to strike the cam C with such force as to throw it forcibly and quickly outward, and bring the dog in upon tooth 3, where it will be caught by tooth 4 before it has time to escape, as seen in Fig. 2.

The sliding weight F, fixable on pawl B, Fig. 2, is one mode of adjustment for varying the limit of speed. In order, however, to cause the dog to operate with certainty, I use, instead of gravity, a very light spring of any kind and convenient form, as E, Fig. 3, which I also make adjustable, as at F'.

The rack-teeth A', Fig. 3, are in vertical relations to the detent B', and the slide to which B' is pivoted (an elevater-cage) is shown descending slowly with the like escapement action of C D under spring E as under gravity in Fig. 1, a like engagement being also effected by a quickened descent, as seen in Fig. 4. It is obvious that these Figs. 3 and 4 may likewise be viewed as in an inclined, horizontal, or any desirable plane of action with the same working results; and it is, furthermore, obvious that dog B' and spring E, Fig. 3, combined with the ratchet-wheel A, Fig. 1, would work likewise in any desirable position of the apparatus.

By using a spring which normally tends to press the cam C against the rack, and the force of which must be overcome by the momentum imparted by the impact of the teeth of the wheel or rack, I am enabled to use the safety-catch in any position and at any angle, and in portable apparatus where the position is constantly changing—a thing impossible with a gravity-dog merely.

In my apparatus the curved or cam end of the pawl is operated directly by the teeth of the rack with which the dogging end engages. By such a construction I reduce the number of parts to the minimum and produce an organization of great simplicity and perfect operation. I prefer to employ a dog or detent of the general character illustrated in preference to a detent consisting of a catch or latch which, in stopping the descent of the platform, suspends it by engaging with the rack, or, in other words, where the weight of the platform is thrown upon the catch below its point of engagement with the rack, although such detents may be employed under my organization. The dogging action of my detent gives a much stronger construction and a more effective operation.

Fig. 5 illustrates a double rack-elevator with the teeth of one rack, A″, reversed relatively to the other, A′, and a slide or portion of a platform carrying two spring-controlled dogs, B″ B″, each arranged relatively to one of the racks, as above set forth. The speed of the platform will thus be controlled both in ascent and descent.

It will be obvious that two ratchet-wheels may be arranged in like manner under the organization shown in Figs. 1 and 2, to control the speed of revolution of the drum in either direction. By making the ratchet or rack teeth very much hooked, and by making dog D correspondingly hooked, and by suitably shaping cam C, the detents B, B′, or B″ may be reversed and similar results be obtained.

Of course the character of the ratchet and rack-teeth, the shape and detail of the dogs and cams, and their exact relation to each other may be varied without departing from my invention, which will hereinafter be specifically claimed. I therefore do not limit myself to the forms of detents and teeth shown, nor to their combinations with and precise relations to the other parts shown and described.

A quick-working detent may be made by fixing the pivot near the cam end or near the teeth, or lengthening the cam end, or weakening the spring, or by an abrupt inner curve or angle of the cam, or shortening and convexing the teeth, or increasing the distance between C and D to more nearly that between teeth 1 and 3, or 1 and 4, or 1 and 5, as the case may be, while a detent that requires higher speed to engage it may be made by reversing those methods. In some instances a roller may be substituted for C, which roller may also be elastic. By making the controlling-spring reversible, the device may optionally revert to the common detent uses—for example, by fixing spring E, Fig. 5, opposite the pivot, so as to be reversible and act on either C or D. The detent may be lengthened to cover three teeth or more, as desired, and C or D, or both of them, may be doubled to simultaneously engage two teeth.

In Figs. 6 and 7 the pivoted pawl, having the cam end C and dog D, instead of being pivoted directly to the frame, elevator-platform, or slide, is pivoted upon a plate, P, which is itself pivoted to the platform, to one side of the pivot of the pawl, away from the rack. The pawl is controlled by a spring, E, as before described. The plate P is prevented from swinging away from the rack A′ at its bottom by the pin $p$, around which the spring E is turned, and is elastically prevented normally from swinging toward the rack by a coiled spring, S, one end of which is connected to a strong bolt, $s$, on the plate and the other to the platform. The operation of engaging the dog in the rack is exactly as before described; but when the dog strikes against the rack-tooth and suddenly stops the descent or ascent, as the case may be, of the platform, the plate P will swing up and toward the rack at its lower end by reason of the upward strain upon the pivot of the pawl. This will cause a direct pull upon the spring S, and afford an elastic cushion to receive the shock of the sudden stoppage. In Fig. 6 the detent is shown as just engaging with the rack, and in Fig. 7 it is illustrated as having the shock of the stoppage thrown upon it.

Of course various other ways of giving the necessary elasticity may be devised. For instance, the end of the plate P might be made to move against an elastic cushion or compress a coiled spring, instead of pulling upon one, as above described, and I do not therefore limit myself to the details shown.

The pawls shown in Figs. 1 and 2, as operating on ratchets, may, of course, readily be provided with the elastic cushion, as described.

What I claim as my invention is—

1. The combination, substantially as set forth, of a rack or ratchet, and a detent operated directly by the same rack or ratchet with which it engages when the speed of the parts exceeds a given limit.

2. The combination of the rack or ratchet, the detent, a device for throwing the detent into engagement with the teeth when the speed of the parts is increased beyond a given limit, and an elastic cushion to ease the shock of the parts, substantially as set forth.

3. The combination of the rack or ratchet, the detent adapted to engage therewith when the speed exceeds a given limit, and a spring for controlling the action of the detent, substantially as set forth.

4. The combination of two racks or ratchets reversed relatively to each other, and two detents, each adapted to engage with its respective rack or ratchet when the speed of the parts exceeds a given limit in either direction, substantially as set forth.

5. The combination, substantially as set forth, of an elevator-frame, two racks, the teeth of which are reversed relatively to each other, a traveling platform or cage, and a detent for each rack, having a cam and dog, as set forth, one pawl being arranged to engage with its rack and stop the platform when it exceeds a given speed in ascending, and the other to operate in like manner when the platform is descending.

6. The combination, substantially as set forth, of a rack or ratchet, a dog, and means for causing the dog to engage with the rack or ratchet to receive the thrust and stop the motion of the parts when the speed has exceeded a given limit.

In testimony of which invention I hereunto set my hand.

WOODBURY STORER HOW.

Witnesses:
  JAMES H. LAYMAN,
  GEO. H. KOEKER.